United States Patent [19]

Jenn et al.

[11] 4,034,663
[45] July 12, 1977

[54] VENTILATED PORTABLE ELECTRIC GRILL

[75] Inventors: Louis J. Jenn; Thomas R. Field; Joseph J. Cerola, all of Indianapolis, Ind.

[73] Assignee: Jenn Air Corporation, Indianapolis, Ind.

[21] Appl. No.: 589,060

[22] Filed: June 23, 1975

Related U.S. Application Data

[63] Continuation-in-part of Ser. No. 498,628, Aug. 19, 1974, abandoned.

[51] Int. Cl.² .................... H05B 1/00; A47J 37/06; F23J 11/08
[52] U.S. Cl. .......................... 99/446; 126/299 D; 99/401; 126/21 A; 126/300; 219/386; 219/461; 219/521
[58] Field of Search ............ 99/379, 385, 401, 444, 99/445, 446, 447, 450, 393; 98/115 K, DIG. 7, 115 K; 219/400, 443, 461, 385, 386, 521; 126/21 A, 21 R, 300

[56] References Cited

U.S. PATENT DOCUMENTS

| | | | |
|---|---|---|---|
| 1,895,371 | 1/1933 | Briegel | 219/400 X |
| 2,211,940 | 8/1940 | Stoner | 126/21 A |
| 2,348,455 | 5/1944 | Daudelin | 98/DIG. 7 |
| 2,459,657 | 1/1949 | Klein | 99/393 |
| 2,812,708 | 11/1957 | DelFrancia et al. | 219/443 X |
| 3,089,479 | 5/1963 | Perl | 126/21 A |
| 3,292,525 | 12/1966 | Jensen | 98/115 K |
| 3,555,995 | 1/1971 | Berger | 99/446 |
| 3,616,744 | 11/1971 | Jensen | 98/115 K |
| 3,695,164 | 10/1972 | Stalker | 98/115 K |
| 3,712,819 | 1/1973 | Field | 99/400 |

*Primary Examiner*—A. Bartis
*Attorney, Agent, or Firm*—Woodard, Weikart, Emhardt & Naughton

[57] ABSTRACT

Disclosed is a portable grill assembly adapted for use on, for example, a kitchen countertop area. The assembly includes a somewhat L-shaped housing, the horizontally extending portion of which encloses a heating element and is topped by a grill element for supporting meat or other edibles for exposed surface broiling. The adjoining upwardly extending portion houses a power driven fan which draws air, smoke and cooking vapors from across the grill element and into the upwardly extending portion. The fan outlet discharges to the exterior of the housing.

3 Claims, 8 Drawing Figures

VENTILATED PORTABLE ELECTRIC GRILL

BACKGROUND OF THE INVENTION

This application is a continuation-in-part of Jenn et al, U.S. patent application Ser. No. 498,628, filed Aug. 19, 1974, now abandoned.

Ventilated ranges are well known in the prior art. Examples of these are disclosed in U.S. Pat. Nos. 3,712,819, 3,596,650 and 3,587,555, assigned to the assignee of the present invention. The assembly embodying the present invention incorporates a ventilating fan, as do the prior art ranges, but is relatively small in size and portable. In its utilization it falls in the category of a "traffic appliance", as do electric toasters and similar small appliances adapted for kitchen countertop or table-top use. The ventilation of the grill assembly does not require a hood installation, and a flexible tube, attached to the fan outlet, permits the fan discharge to be removed through a window panel, a wall fitting to an exterior vent or, in general, to a location remote from the grill assembly.

DESCRIPTION OF THE PREFERRED EMBODIMENTS

Figure 1:
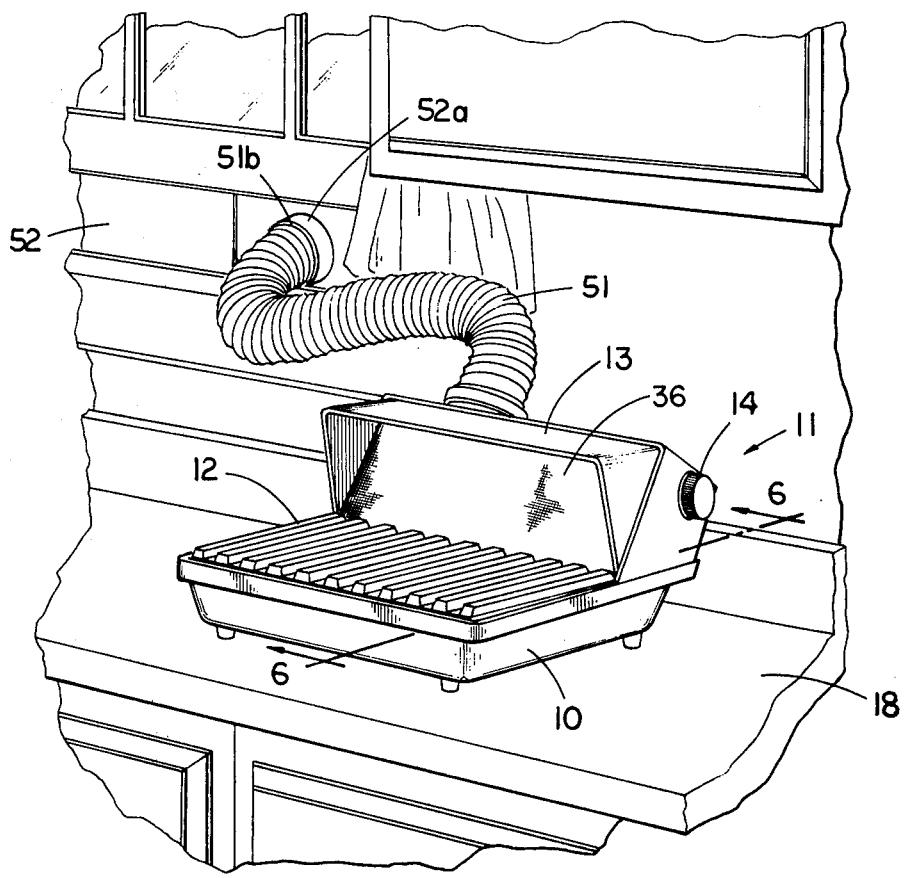
FIG. 1 is a perspective view of an assembly embodying the present invention shown in a typical countertop environment.
Figure 2:
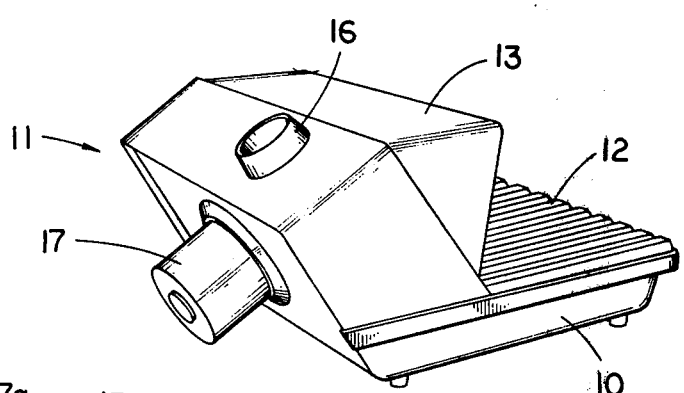
FIG. 2 is a perspective rear view of the structure shown in FIG. 1.

Referring initially to FIG. 1, the portable grill assembly embodying the present invention is formed by the generally L-shaped housing having a forwardly extending portion indicated generally at 10 and, disposed at its rear margin, an upwardly extending portion indicated generally at 11. As will be particularly evident from FIG. 6, portion 11 of the housing extends at approximately a 120° angle with the forwardly extending housing portion 10. Extending over the upper face of the portion 10 is a support means taking the form of grate member 12. The inclined adjacent front face of the portion 11 is shielded by an integral hood 13. A knob 14, for manual control of the electrical heating element in the housing is accessible on the side surface of housing portion 11 for manual adjustment as shown in FIG. 1. The upper face of the housing portion 11 carries an annular flange 16 which encircles an opening permitting exit of the discharge of the fan whose drive motor 17 extends from the rear surface of housing portion 11.

Figure 5:
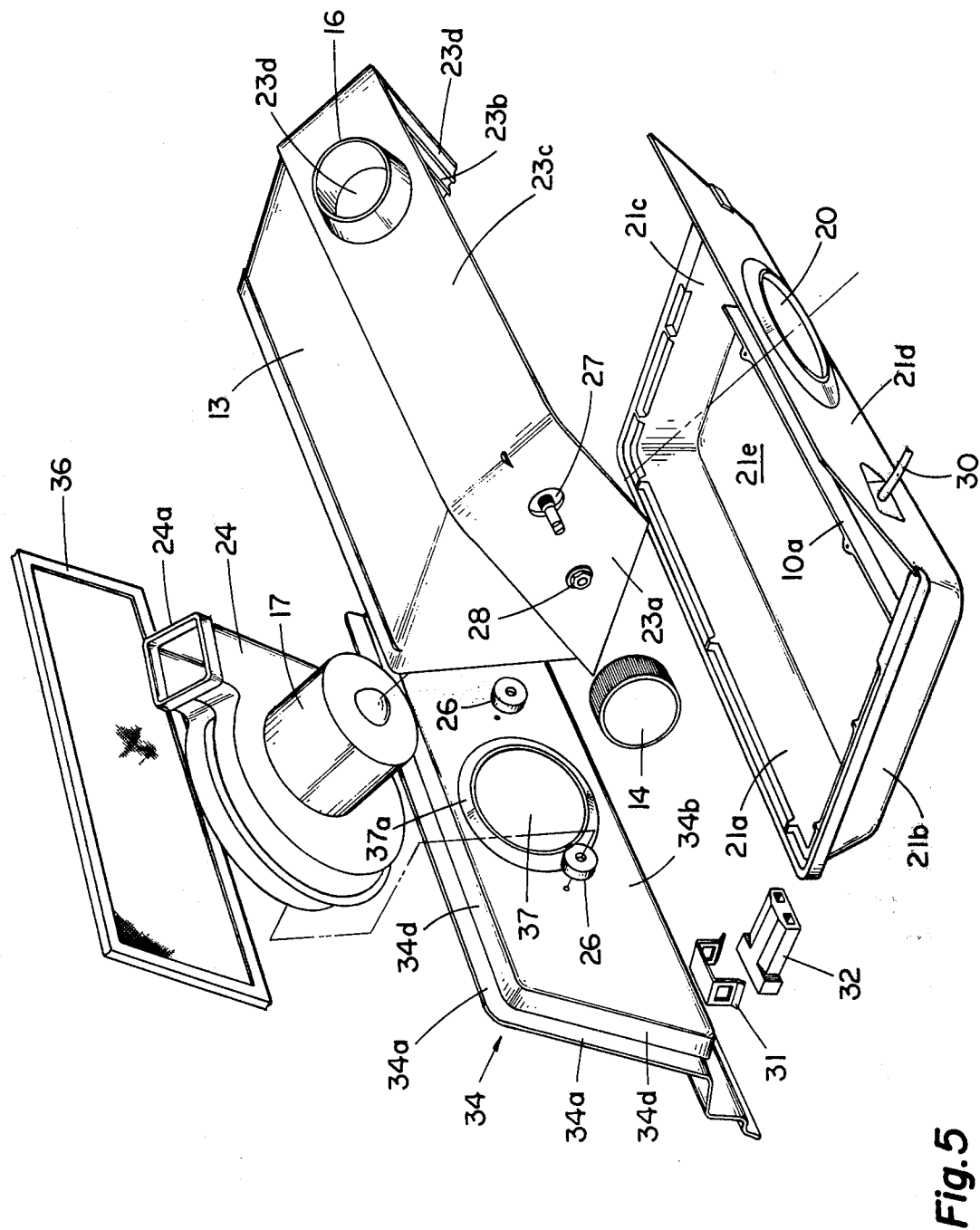
FIG. 5 is a perspective, exploded view of a portion of the assembly.
Figure 6:
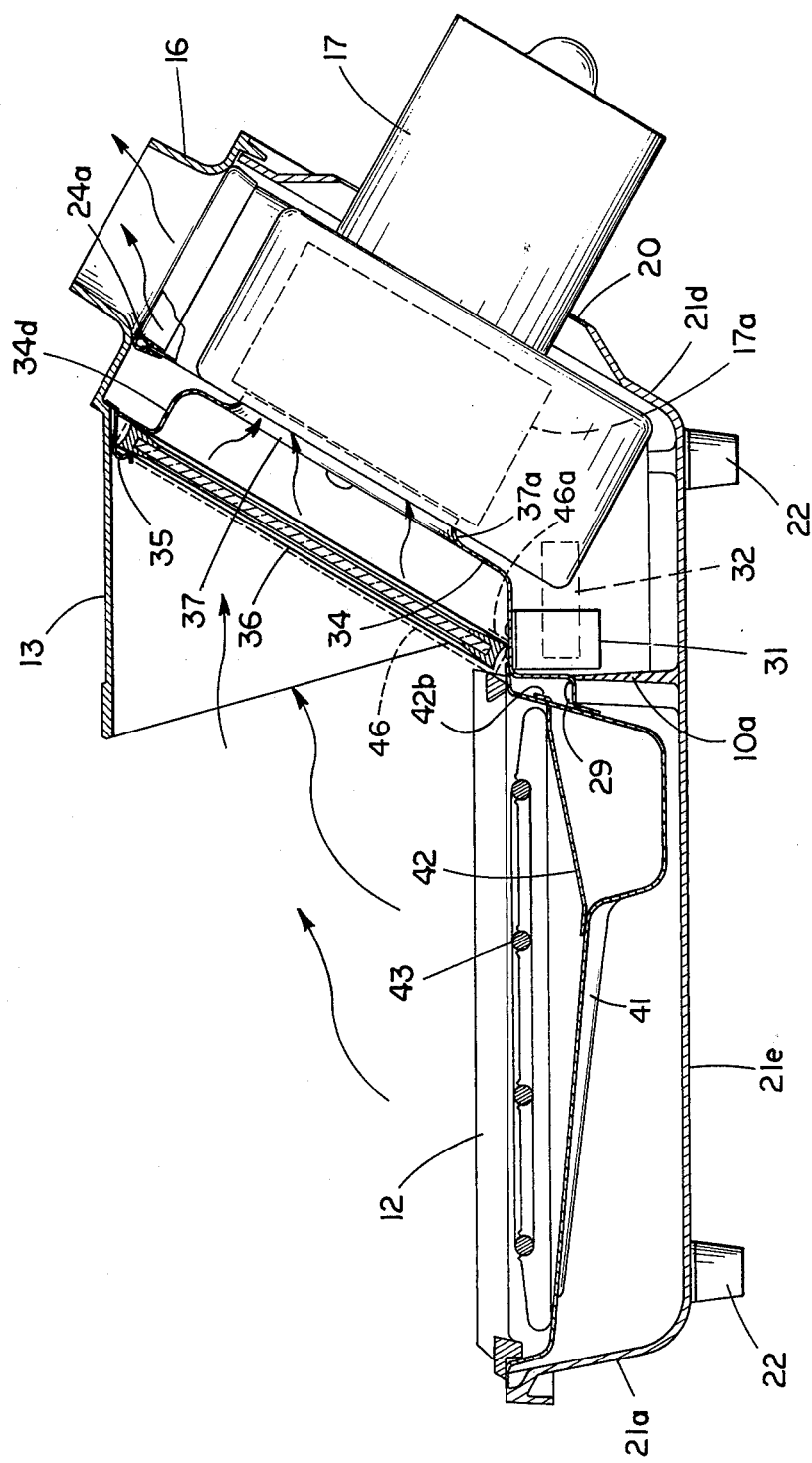
FIG. 6 is a side, sectional view of the assembly taken generally along the line 6—6 of FIG. 1.

As may best be seen in FIGS. 5 and 6, the forwardly extending portion 10 is composed of a generally rectangular, dished member having a front wall 21a, sidewalls 21b and 21c, a base 21e and a rear wall 21d. The rear wall 21d is inclined outwardly and extends upwardly to form the rear wall of the portion 11 of the housing. Integral legs 22 (FIG. 6) extend from the underface of the housing and support it about the countertop 18 (FIG. 1) on which the appliance is positioned.

As may be seen in FIG. 5, a U-shaped member provides integral side walls 23a and 23b and top wall 23c of the upwardly extending portion 11 of the housing. Grooves 23d, formed at the margins of walls 23a and 23b receive the side margins of the back plate 21d. The sidewalls extend to the flanged margins of the sides 21b and 21c, respectively, and the top wall 23c overlies the edge of rear wall 21d when the housing components are assembled. The top wall 23c is provided with an aperture 23d, defined by flange 16, which receives the discharge nozzle portion 24a of the centrifugal fan scroll casing or housing 24. The fan is secured, by suitable mounting screws and the rubber mounting washers 26, to the adjacent face of the rear wall 21d with the motor 17 extending through the opening 20 in the rear wall.

The side wall 23a carries a control switch 27 whose shaft extends through the mounting member 28 and carries the knob 14 (previously mentioned with respect to FIG. 1), the switch providing control of the electrical energy input to an electric broiling element to be subsequently described. The base 21e of the portion 10 of the housing is formed with an integral, transverse wall 10a (FIG. 6) which serves as a divider separating and protecting the rear portion of the housing from grease which might accumulate in the front area. Fastened by screws 29 (FIG. 6) to the wall 10a is a front plate 34. Plate 34 carries a depending bracket 31 (FIG. 5) which supports an electrical receptacle 32 whose contact members are connected by wiring 30 extending through plate 21 to the control 27 and to a conventional domestic source of electrical power such as a 110 volt AC receptacle. The receptacle 32 at its front end, accomodates contacting terminal prongs of the broil element to be subsequently described.

Overlying the front margins of the housing walls 23a, 23c and 23b is the front plate 34, previously mentioned, having bordering flanges 34a and a rearwardly offset portion 34b enclosed by side portions 34d. As will be evident from FIG. 6, the flange portion 34a of plate 34 has resting against it a conventional rectangular shaped grease filter 36 which may be retained in place by spring clip 35. The central area of plate 34 formed by side portions 34d and base 34b function as a plenum for the fan and has a central, flanged aperture 37 which, in the assembled apparatus registers with the intake opening of the fan housing 24, the flange 37a providing a conical inlet orifice for the fan whose bladed wheel is indicated at 17a in FIG. 6.

Figure 3:
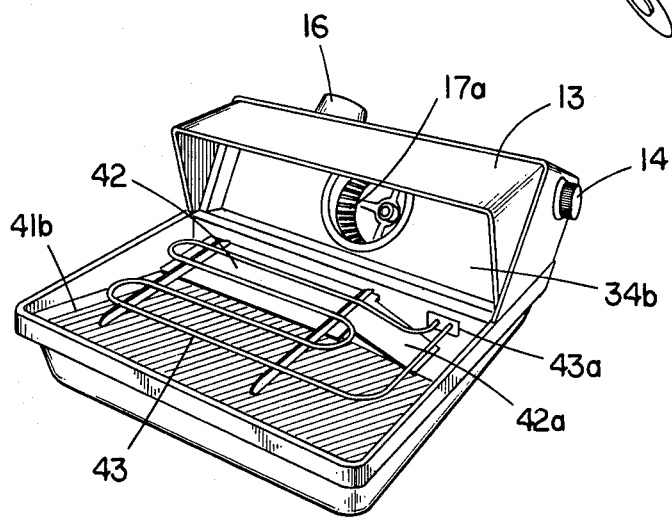
FIG. 3 is a perspective front view of the structure shown in FIG. 2 with the grate member removed.
Figure 4:
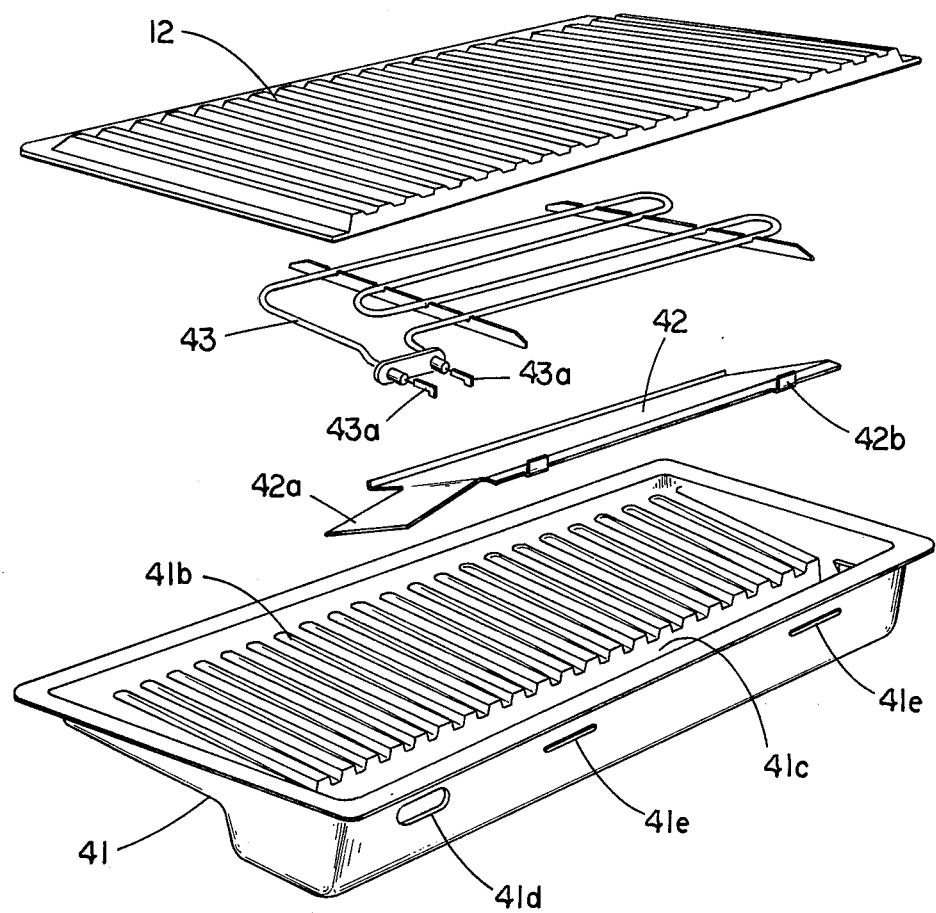
FIG. 4 is a perspective, exploded view of the grate, heating unit, shield and drain pan components of the assembly.

Referring to FIG. 4, the components which fit within the dished member bounded by sidewalls 21a, 21b and 21c will be described. These include the drain pan 41, which has an inclined, channelled base 41b to facilitate draining and to extend the heat dissipating surface of the pan. A deeper portion of the pan 41c, extending along the rear margin, serves as a reservoir for collecting grease and food drippings. A broil element 43, a shield plate 42 and the overlying grate 12 complete the assembly. The plate 42, as may be seen in FIG. 3 and 6, overlies the reservoir 41c and has a downwardly inclined end portion 42a (FIG. 4) which underlies and shields the terminal portion of element 43 from drippings in the reservoir 41a and shields the collected drippings from radiant heat from the broil element. Tabs 42b on plate 42 are accommodated in slots 41e in pan 41.

The element 43 is of the sheathed, electrical resistance type and is provided with adjacent terminal prongs 43a which are adapted to extend into the receptacle 32 (FIG. 3), the terminals 43a extending through aperture 41d in the side wall of the drain pan 41. The grate 12 tops the components accommodated in the base portion 10 of the assembly, the outwardly extending marginal portion of the grate overlying the flanged margins of the drain pan as is shown in FIG. 6. The drain pan 41, and the components accommodated on it, are removable from the main housing, the terminals 43a of the broil element being separable from the accommodating receptacle 32. FIG. 3 shows the apparatus with grate 12 and filter 36 removed.

As may be seen in FIG. 1, the flange ring 16 receives the end fitting of a flexible tube 51. As shown in FIG. 1, the tube extends to a window spacer plate 52 which may be inserted just above the window sill and the window then is closed against the upper margin of the plate. The plate is made in two slidable sections so that it can be adjusted to varying window widths. It can be formed of sheet aluminum, or similar material and is provided with a flanged opening 52a which accommodates the fitting 51b at the remote end of the tube 51. The spacer plate aperture thus provides a vent for the fan discharge which opens to atmosphere at the room's exterior. In operation, meat or other food placed on the grate 12 may be cooked by convection and radiated heat from the element 43 and the smoke and vapors will be drawn through the filter 36 and discharged through the tube 51.

Figure 7:
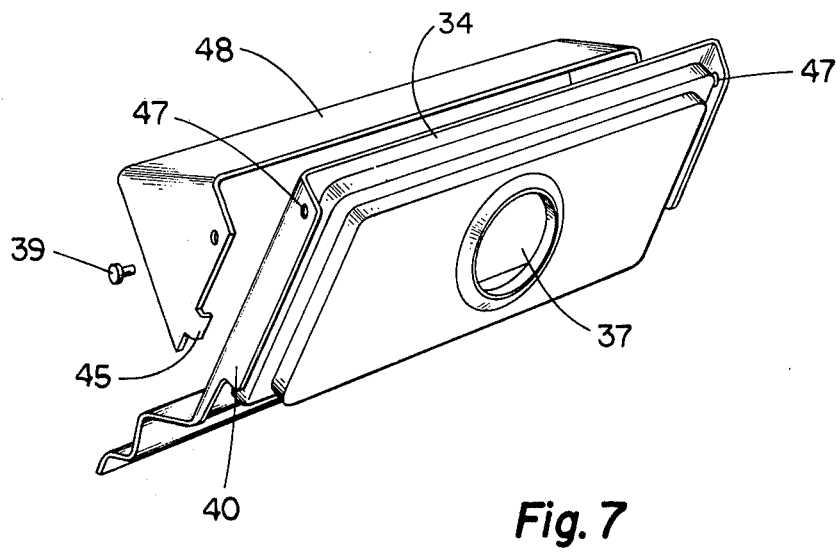
FIG. 7 is a perspective, exploded view of a portion of a modified form of the assembly.

Referring to FIG. 7, a modified form of construction for the housing component 34 and hood 13 is illustrated. This modified form differs from that previously described only in that the hood 13 is not integral with body member 11. In this modified form the front plate 34 is provided with rearwardly extending flanges 40 which are apertured at 47 to receive pins 39 which pivotally mount the moveable hood 48. Tabs 45 define the maximum extended position of hood 48. Friction at pins 39 permits the hood to be adjustably positioned with relation to the plane of the underlying filter element 36.

Figure 8:
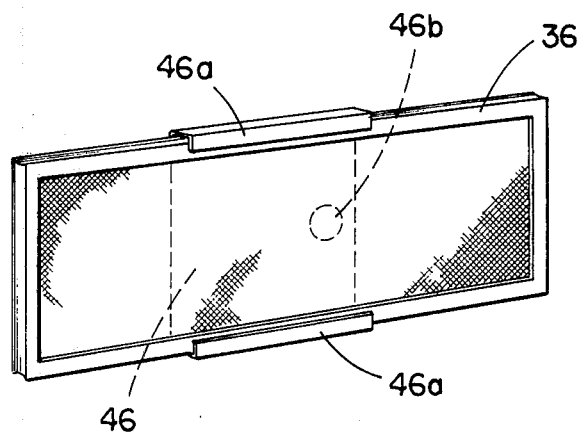
FIG. 8 is a perspective view of the filter component with an optional slide-closure member in place on it.

Referring to FIG. 8, the filter element 36 is shown provided with a closure member 46. The closure member 46 shown also in phantom lines in FIG. 6, takes the form of a metal plate having marginal flanges 46a which are formed to slidably accommodate the opposite frame members of the filter element. The member 46 overlies the filter element when in place on the plate 34 and the finger aperture 46b facilitates adjustable, lateral positioning of the closure member on the filter element. The closure member serves the function of adjustable slowing or obstructing the entry of air into the intake plenum formed by the dished plate 34 adjacent the fan intake. This slowing of the air flow is desireable where a rotisserie, for example, is installed in the assembly after grate 12 has been removed.

The portable grill described is relatively small in size and of relatively low power input. The approximately 120° angle between housing portions 10 and 11 provides the low vertical profile characteristic of the grill assembly, giving it stability and permitting it to fit under and clear overhanging cabinets which may be located above a conventional kitchen countertop. It permits meat or other food products surface broiled on the grate 12 to smoke and sizzle during the broiling operation, the smoke and vapors being drawn off through the hood 13 and filter 36 and the presence of smoke and cooking vapors, together with the broil-sound given off by the meat provides an aura and appetizing effect normally associated with outdoor cooking. The assembly may be used on the conventional kitchen countertop as shown in FIG. 1, or on a table top. Where a window vent fitting, such as plate 52 of FIG. 1, is provided adjacent the countertop surface, the fan discharge can be vented to atmosphere by means of a flexible tube of suitable, relatively short length. In other applications, the flexible tubing may be extended to the exterior of the room by means of a wall or baseboard mounted fitting. The sump or reservoir chamber 41c in the drippings collecting pan 41 is shielded from radiant heat emitted from the high temperature portion of element 43 by the plate 42. Location of the fan immediately adjacent the cooking surface makes possible the high capture velocity necessary to effectively carry away cooking vapors originating at the cooking surface. Where it is desireable to vary the air flow the form of the assembly utilizing the protruding hood, identified at 48 in FIG. 7, may be utilized. The hood is adjustable about pins 39 and has an air metering function. It cannot be positioned to completely close off the fan intake but can be adjusted, where conditions make it desireable, to a minimum flow position in which the air intake opening is approximately 1 inch in width. This minimum air flow position is suitable for use when the assembly has a rotisserie installed above the heating unit 43. The form of the assembly utilizing baffle plate 46, referred to with reference to FIG. 8, offers a simplified means for also performing this air metering function. Positioning of the plate 46 on the filter element serves to adjustably obstruct the intake of fan 17a to selectively provide the desired air flow. It will be understood that, with grate 12 removed, cooking units such as a griddle or rotisserie may be installed in the assembly, and the baffle plate 46 may be positionally adjusted, as mentioned above, to properly accommodate the differing cooking units.

While the invention has been disclosed and described in some detail in the drawings and foregoing description, they are to be considered as illustrative and not restrictive in character, as other modifications within the scope of the invention may readily suggest themselves to persons skilled in the art.

I claim:

1. A portable electric cooking unit for countertop use comprising a housing of such size as to be capable of being positioned on a conventional kitchen countertop, said housing having a forwardly extending portion with an upwardly extending portion disposed at its rear margin, the height of said upwardly extending portion being substantially less than the forward extension of said forwardly extending portion, said forwardly extending portion having an open-topped dished configuration of relatively shallow depth compared to the overall height of said housing, a grease collector pan removably seated in said dished housing portion and having a sump area extending along the pan margin which is immediately adjacent said upwardly extending portion of the housing, an electrical radiant heating unit disposed in overlying relation to said pan in said forwardly extending housing portion, food supporting means overlying said heating unit, a shielding member removably mounted in said collector pan below the heating unit to overlie only said sump area to thereby shield said area from radiant heat emitted from the heating unit, the front face of said upwardly extending housing portion immediately adjacent said heating unit having an opening providing an inlet to the interior of said upwardly extending housing portion for smoke and fumes rising therefrom, and a power driven fan mounted within said upwardly extending portion of said housing for drawing air through said inlet and expelling it from said housing through an outlet therein.

2. A portable electric cooking unit as claimed in claim 1 in which means are provided for adjustably obstructing said inlet to vary the air flow across said forwardly extending housing portion.

3. A portable, surface-broiling grill assembly for countertop use comprising a generally L-shaped, metal housing of such size as to be capable of being positioned on a conventional kitchen countertop, said housing being formed by a forwardly extending portion with an upwardly extending portion disposed at its rear margin, said forwardly extending portion having an open-topped dished configuration of relatively shallow depth compared to the overall height of said housing, said upwardly extending portion projecting in permanent angular relation of approximately 120° with respect to said forwardly extending portion, an electrical heating unit mounted in said forwardly extending portion of the housing with a metal grate overlying the heating unit, the front face of said upwardly extending portion of the housing adjacent said grate having an opening providing an inlet to the interior of said upwardly extending housing portion for smoke and fumes rising from said grate, and a power driven fan mounted within said upwardly extending portion of the housing for drawing air through said inlet and expelling it from said housing through an outlet therein.

* * * * *